United States Patent
Harada et al.

(10) Patent No.: US 11,655,751 B1
(45) Date of Patent: May 23, 2023

(54) ENGINE

(71) Applicant: Mazda Motor Corporation, Hiroshima (JP)

(72) Inventors: Yuji Harada, Aki-gun (JP); Kenji Uchida, Aki-gun (JP); Ryohei Ono, Aki-gun (JP); Masayuki Kidokoro, Aki-gun (JP); Kazuhiro Nagatsu, Aki-gun (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 17/989,975

(22) Filed: Nov. 18, 2022

(30) Foreign Application Priority Data

Dec. 6, 2021 (JP) .............................. JP2021-198072

(51) Int. Cl.
*F02B 19/10* (2006.01)
*F02B 19/12* (2006.01)

(52) U.S. Cl.
CPC ...... *F02B 19/1014* (2013.01); *F02B 19/1023* (2013.01); *F02B 19/12* (2013.01)

(58) Field of Classification Search
CPC ... F02B 19/1014; F02B 19/1023; F02B 19/12
USPC ................................................ 123/266, 259
See application file for complete search history.

(56) References Cited

U.S. PATENT DOCUMENTS

| | | | |
|---|---|---|---|
| 3,980,057 A * | 9/1976 | Sanda | F02B 19/12 123/270 |
| 2014/0209057 A1 * | 7/2014 | Pouring | F02B 19/1023 123/257 |
| 2021/0222643 A1 | 7/2021 | Nagatsu et al. | |

FOREIGN PATENT DOCUMENTS

| | | | | |
|---|---|---|---|---|
| CN | 214887352 U | * | 11/2021 | |
| FR | 2846041 A1 | * | 4/2004 | ............ F02B 17/005 |
| JP | 2006503216 A | * | 1/2006 | |
| JP | 2018066369 A | | 4/2018 | |
| JP | 2021113549 A | | 8/2021 | |

* cited by examiner

*Primary Examiner* — Mahmoud Gimie
(74) *Attorney, Agent, or Firm* — Alleman Hall Creasman & Tuttle LLP (57) ABSTRACT

To effectively suppress strong knock that occurs in the operating region of high load and high rotation in a specific engine having a pre-chamber in a combustion chamber, the engine includes a piston that defines a combustion chamber together with a cylinder block and a cylinder head. The combustion chamber includes a sub-chamber and a main chamber separated from the sub-chamber by a pre-chamber. The specific ratio obtained by dividing a volume of the sub-chamber by a stroke volume of a cylinder is greater than or equal to 0.00005 and less than or equal to 0.00045.

13 Claims, 6 Drawing Sheets

JET POTENTIAL $$RET: \frac{dm}{d\theta}\left(u_n + \frac{v_n^2}{2} + R_n T_n\right) \text{ [J/deg.]}$$

| <ENGINE> | | |
|---|---|---|
| COMPRESSION RATIO: ε | 14 TO 25 | |
| BORE | 83.5 TO 89 | mm |
| STROKE | 83.5 TO 133.5 | mm |
| BORE/STROKE RATIO | 1 TO 1.5 | |
| STROKE VOLUME | 500 | cc |
| <PRE-CHAMBER> | | |
| NUMBER OF HOLES | 4 TO 6 | HOLES |
| HOLE DIAMETER | 0.7 TO 1.5 | mm |
| VOLUME | 0.02 TO 0.5 | cm$^3$ |
| | | (UNIT) |

ENGINE

TECHNICAL FIELD

The technology disclosed herein relates to an engine in which a combustion chamber is divided into a large main chamber and a small sub-chamber (pre-chamber) by a partition wall having openings and a spark plug is installed in the sub-chamber.

BACKGROUND ART

In recent years, a pre-chamber ignition system has attracted attention. This ignition system has a sub-chamber and a main chamber as described above in the combustion chamber, ignites an air-fuel mixture in the sub-chamber to inject flame to the main chamber through the openings of the partition wall, and burns the air-fuel mixture in the main chamber. The pre-chamber ignition system can ensure the combustion in the main chamber and improve the thermal efficiency of an engine.

For example, JP2021-113549A discloses an engine system that employs this pre-chamber ignition system. This engine system has a pre-chamber plug, which corresponds to the sub-chamber and the spark plug thereof, and an injector that injects fuel into a main combustion chamber, which corresponds to the main chamber.

Injection of the fuel by the injector generates an air-fuel mixture in the main combustion chamber. Part of the air-fuel mixture also flows into a sub-chamber through the openings of the partition wall. Ignition of the air-fuel mixture having flowed into the sub-chamber injects a flame from the sub-chamber to the main combustion chamber. This burns the air-fuel mixture in the main combustion chamber.

JP2018-66369A also discloses a gas engine that employs this pre-chamber ignition system. In this gas engine, an injector injects fuel gas into a sub-chamber.

Accordingly, in this gas engine, injection of the fuel by the injector causes the fuel to flow into the main chamber through the openings in the partition wall, thereby generating an air-fuel mixture in the main chamber. Ignition of the rich air-fuel mixture in the sub-chamber, which is richer than in the main chamber, injects a flame from the sub-chamber into the main chamber, thereby burning the lean air-fuel mixture in the main chamber.

In JP2018-66369A, the velocity of gas injected into the main chamber is set to greater than or equal to 4 m/s and less than or equal to 7 m/s based on a predetermined sub-chamber index (value obtained by dividing the volume of the sub-chamber by the sum of the opening areas of the sub-chamber) to stably ignite the lean air-fuel mixture in the main chamber.

In general, of the pre-chamber ignition systems, the type that injects fuel into the sub-chamber as in JP2018-66369A is referred to as an active pre-chamber and the type that injects fuel into the main chamber as in JP2021-113549A is referred to as a passive pre-chamber.

SUMMARY OF THE INVENTION

Problem to be Solved by the Invention

Knock (also referred to as knocking) is abnormal combustion that causes noise and impact, and is considered problematic particularly in spark ignition engines. Knocking usually occurs in the operating region of high load and low rotation. Specifically, when combustion of an air-fuel mixture begins with ignition by a spark plug, the combustion spreads due to flame propagation. During that time, self-ignition of an unburned air-fuel mixture (end gas) may occur locally. Since combustion by self-ignition is more rapid than combustion by flame propagation, the pressure oscillation forms noise and impact, thereby causing knock.

The knock that occurs in the operating region of high load and low rotation is gradually eliminated when the number of revolutions is higher and flame propagation is faster. However, although the frequency is low, knock may occur even in the operating region of high load and high rotation. The knock (this knock is also referred to as strong knock) that occurs in the operating region of high load and high rotation tends to be stronger than the knock that occurs in the operating region of high load and low rotation. Accordingly, strong knock is likely to damage an engine and causes the engine to lose reliability. Since strong knock is likely to occur particularly in an engine having a high compression ratio, strong knock hinders the improvement in thermal efficiency.

Problems with knock including such strong knock as described above are also critical to the pre-chamber ignition system described above. That is, when the momentum of the flame injected from the sub-chamber in the operating region of high load and high rotation is strong, the flame propagation in the main chamber becomes excessively fast, possibly causing abnormal combustion. When such abnormal combustion causes air column resonance in the combustion chamber, strong knock due to the pre-chamber ignition system occurs.

Accordingly, it is thought that the occurrence of strong knock can be suppressed by weakening the momentum of the flame injected from the sub-chamber. However, as a result of an investigation of the relationship between the suppression of strong knock and the momentum of a flame, the inventors and others have found that the occurrence of strong knock cannot be suppressed by simply weakening the momentum of a flame and the relationship is satisfied under optimum conditions.

The technology disclosed herein is based on this knowledge, and an object is to effectively suppress strong knock from occurring in the operating region of high load and high rotation in a specific engine having a pre-chamber in a combustion chamber.

Means for Solving the Problem

The technology disclosed herein relates to an engine including a cylinder block in which a cylinder is formed; a cylinder head assembled onto the cylinder block to cover a top of the cylinder; a piston provided so as to reciprocate inside the cylinder, the piston defining a combustion chamber together with the cylinder block and the cylinder head; and a spark plug that performs ignition in the combustion chamber.

The combustion chamber includes a sub-chamber that houses an electrode of the spark plug, and a main chamber separated from the sub-chamber by a partition wall having a through-hole, the main chamber having a volume larger than a volume of the pre-chamber. A specific ratio obtained by dividing the volume of the sub-chamber by the stroke volume of the cylinder is greater than or equal to 0.00005 and less than or equal to 0.00045.

That is, the combustion chamber of this engine is divided into the main chamber and the sub-chamber housing the electrode of the spark plug by the partition wall having the through-hole, so that the engine can perform combustion by the pre-chamber ignition system. Accordingly, since ignition in the sub-chamber can burn an air-fuel mixture in the main chamber by using the flame injected through the through-hole, the combustion in the main chamber is ensured and the thermal efficiency of the engine can be improved.

However, as described above, in the combustion by the pre-chamber ignition system, there is a risk of causing strong knock when the momentum of a flame is strong in an operating region of high load and high rotation. In contrast, the specific ratio that determines the important physical conditions of the engine has been set for this engine based on the knowledge of the inventors and others. Then, the engine is configured so that the ratio falls within the specific range described above.

The specific ratio and range are set based on the optimum conditions found from the relationship between strong knock and the momentum of a flame so as to obtain an appropriate momentum of the flame in the operating region of high load and high rotation. Accordingly, the engine can effectively suppress strong knock.

The specific ratio may be greater than or equal to 0.00013 and less than or equal to 0.00035.

Since this range corresponds to the range in which a more appropriate momentum of the flame than the range described above can be obtained, stronger knock can be more effectively suppressed.

A bore/stroke ratio may be set to greater than or equal to 1 and less than or equal to 1.5.

An engine with a large bore/stroke ratio is not preferable in terms of suppressing strong knock because the combustion speed and the cylinder temperature tend to be excessive. Accordingly, the bore/stroke ratio is preferably less than 1, but an engine with a small the bore/stroke ratio is not preferable in terms of improving fuel efficiency.

In contrast, in this engine, the momentum of the flame can be set to an appropriate range by keeping the specific ratio within the specific range. Accordingly, even when the bore/stroke ratio is set to a relatively large range from 1 to 1.5, inclusive, strong knock can be suppressed. This can achieve both the improvement in fuel efficiency and the suppression of strong knock.

The compression ratio of the engine may be greater than or equal to 14 and less than or equal to 25.

When the compression ratio is small, the filling degree of the air-fuel mixture in the sub-chamber reduces. Since this makes the momentum of the flame weak, there is a risk of a misfire in the medium load operation or the like. Accordingly, the compression ratio is preferably greater than or equal to 14. In contrast, when the compression ratio is large, the filling degree of the air-fuel mixture in the sub-chamber becomes large. As a result, the momentum of the flame becomes stronger, so strong knock is likely to occur. Accordingly, the compression ratio is preferably less than or equal to 25.

The engine may further include an injector that injects fuel into the main chamber, and an air-fuel mixture in the sub-chamber may be generated by causing the fuel injected by the injector to flow into the sub-chamber through the through-hole.

That is, this engine adopts the passive pre-chamber. Unlike the active chamber, which injects fuel into the sub-chamber, the passive pre-chamber, which injects fuel into the main chamber, only indirectly regulates the amount of fuel in the sub-chamber. Accordingly, the momentum of the flame is almost uniquely determined by the physical conditions of the engine, such as the size of the through-hole. Accordingly, unlike the active pre-chamber, the passive pre-chamber cannot easily achieve stable combustion with good fuel efficiency.

In contrast, by configuring the engine so that the specific ratio falls within the specific range as described above, an appropriate momentum of the flame can be formed in the operating region of high load and high rotation. Accordingly, stable combustion with good fuel efficiency can be achieved even in the passive pre-chamber.

The injector may inject liquid fuel.

Gaseous fuel can be mixed with air immediately after being injected from the injector. Accordingly, even when the fuel is injected into a small sub-chamber, a uniform air-fuel mixture can be generated in the sub-chamber, and the fuel can be smoothly injected into the main chamber through the through-hole. In contrast, when the liquid fuel is injected into a small sub-chamber, the droplets adhere to the partition wall, thereby making it difficult to generate a uniform air-fuel mixture in the sub-chamber. It is also not easy to inject the liquid fuel into the main chamber through the through-hole.

Accordingly, when the fuel is liquid, the passive pre-chamber is more preferable than the active chamber. Since the fuel is injected into the main chamber with a larger volume, a uniform air-fuel mixture can be generated. Since part of the air-fuel mixture flows into the sub-chamber, the air-fuel mixture in the sub-chamber can also be uniform.

The through-hole may be one of four to six through-holes that are formed in the partition wall so as to be arranged at intervals in a circumferential direction around the electrode of the spark plug.

When the number of through-holes is less than or equal to three, the range within which the flame injected from the sub-chamber is distributed in the circumferential direction becomes narrow, so the combustion in the main chamber may be nonuniform. Accordingly, the number of through-holes is preferably greater than or equal to four. In contrast, if the number of through-holes is greater than or equal to seven, the range over which the flame is distributed in the circumferential direction is extended, but these through-holes are difficult to achieve because, for example, the strength of the partition wall is disadvantageously reduced.

Moreover, the number of through-holes also affects the momentum of the flame. In contrast, since the size of the injection holes can be set within an appropriate range when the number is greater than or equal to four and less than or equal to six, a jet potential can be set within the optimal range described above while the flame is appropriately distributed in the circumferential direction.

Advantage of the Invention

According to the technology disclosed herein, in the specific engine having the pre-chamber in the combustion chamber, strong knock that occurs in the operating region of high load and high rotation can be effectively suppressed. Accordingly, the thermal efficiency of the engine can be improved.

BRIEF DESCRIPTION OF THE DRAWINGS

FIGS. 2A and 2B are diagrams illustrating a pre-chamber plug.

MODES FOR CARRYING OUT THE INVENTION

The technology disclosed herein will be described below. However, the following description is essentially only an example.

<Structure of an Engine>

Figure 1:
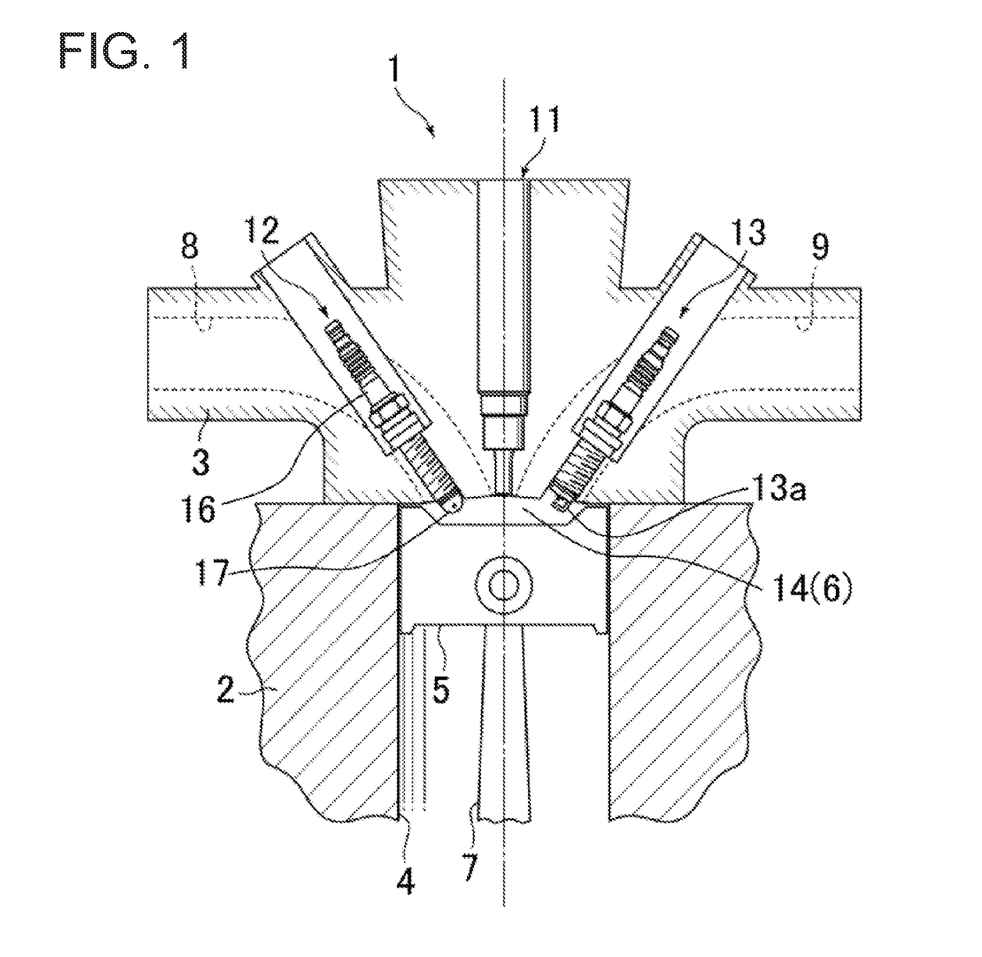
FIG. 1 is a structural diagram schematically illustrating an engine.

FIG. 1 illustrates a main portion of an engine 1 to which the technology disclosed herein has been applied. This engine 1 is a vehicle-driving reciprocal engine installed in a vehicle. The engine 1 repeats four strokes including intake, compression, combustion, and exhaust strokes by using gasoline as liquid fuel (four-stroke engine).

This engine 1 has a compression ratio $\varepsilon$ (geometric compression ratio) higher than that of a normal engine to improve thermal efficiency so as to achieve efficient combustion with less fuel. Then, the engine adopts a pre-chamber ignition system (passive pre-chamber) to enable more rapid combustion than normal engines.

The engine 1 includes a cylinder block 2 and a cylinder head 3. The cylinder block 2 has four cylinders 4 (only one is illustrated in FIG. 1). The cylinder head 3 is assembled onto the cylinder block 2 to cover the tops of the cylinders 4.

A piston 5 is installed in each of the cylinders 4. A connecting rod 7 coupled to a crankshaft is connected to the piston 5 so that the piston 5 reciprocates in the cylinder 4. A combustion chamber 6 for performing combustion is defined by the cylinder block 2, the cylinder head 3, and the piston 5. Furthermore, the combustion chamber 6 of the engine 1 is divided into a main chamber 14 and a sub-chamber 15 by a pre-chamber 17 as described later.

The compression ratio $\varepsilon$ of the engine 1 is set based on the required specifications. Since the thermal efficiency of the engine 1 needs to be higher than in the conventional engine, the compression ratio $\varepsilon$ is preferably set to greater than or equal to 14 and less than or equal to 25, more preferably greater than or equal to 16 and less than or equal to 18.

When the compression ratio $\varepsilon$ is small, the filling degree of an air-fuel mixture (that is, air and fuel), which may include exhaust gas, from the main chamber 14 to the sub-chamber 15 is small. Since the density of the air-fuel mixture in the sub-chamber 15 decreases when the filling degree of the air-fuel mixture to the sub-chamber 15 is small, the momentum of the flame injected from the pre-chamber 17 becomes weak. As a result, there is a risk of a misfire in the operation of medium load or the like in which the amount of fuel is relatively small. Accordingly, the compression ratio $\varepsilon$ is preferably greater than or equal to 14 in terms of suppressing such a misfire.

In contrast, when the compression ratio $\varepsilon$ is large, the filling degree of the air-fuel mixture from the main chamber 14 to the sub-chamber 15 is large. As a result, strong knock is likely to occur in the operation of high load and high rotation in which the amount of fuel is relatively large. Accordingly, the compression ratio $\varepsilon$ is preferably less than or equal to 25 in terms of suppressing strong knock.

An intake port 8 and an exhaust port 9 are formed in the cylinder head 3. An intake valve and an exhaust valve, which are not illustrated, are provided in the intake port 8 and the exhaust port 9, respectively, so as to open and close the openings close to the combustion chamber 6.

An intake passage and an exhaust passage, which are not illustrated, are connected to the intake port 8 and the exhaust port 9, respectively. In addition, this engine 1 is provided with an exhaust gas recirculation (EGR) system. That is, an EGR passage, which recirculates part of the exhaust gas having passed through a three-way catalyst to the intake passage, is connected to the exhaust passage. This EGR passage has an EGR cooler and an EGR valve, which controls the flow rate of the exhaust gas flowing through the EGR passage.

The EGR system is preferably provided in the engine 1 in terms of improving the thermal efficiency, but this is not necessary. In addition, this engine 1 does not have a supercharger. That is, the engine 1 is a naturally aspirated engine. However, a turbocharger may be installed depending on the specifications of the engine 1.

An injector 11, a pre-chamber plug 12, and a normal plug 13 (second spark plug) are attached to the cylinder head 3. The injector 11 is provided on the axis of the cylinder 4 so as to face the center portion of the combustion chamber 6 when the combustion chamber 6 is seen from above. The pre-chamber plug 12 and the normal plug 13 are disposed on both sides of the injector 11 so as to sandwich the injector 11.

The pre-chamber plug 12 is disposed so as to extend diagonally downward from a portion near the intake port 8 so that the tip thereof faces the combustion chamber 6. The normal plug 13 is disposed so as to extend diagonally downward from a portion near the exhaust port 9 so that the tip thereof faces the combustion chamber 6. It should be noted that the pre-chamber plug 12 may be provided in a portion near the exhaust port 9 and the normal plug 13 may be provided in a portion near the intake port 8.

The normal plug 13 has an electrode 13a at the tip thereof. The electrode 13a of the normal plug 13 faces the main chamber 14. The main chamber 14 occupies most of the volume of the combustion chamber 6 and constitutes the main body of the combustion chamber 6. The original combustion performed by the engine 1 is performed in this main chamber 14.

(Pre-Chamber Plug 12)

The pre-chamber plug 12 has a spark plug 16 (first spark plug) and the pre-chamber 17 provided at the tip thereof. This pre-chamber 17 defines part of the combustion chamber 6 to form the sub-chamber 15 in the pre-chamber 17.

Figure 2A:
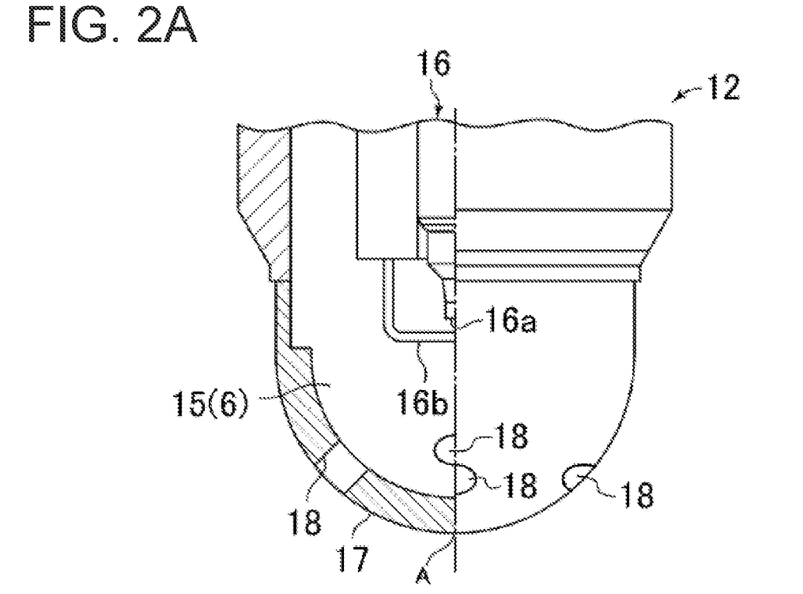
FIG. 2A is a side view in which a cross section is partially illustrated.

FIG. 2A illustrates the tip portion of the pre-chamber plug 12. The pre-chamber 17 includes a hemispherical partition wall that covers the tip portion of the spark plug 16 and the sub-chamber 15 is formed in the pre-chamber 17. The electrodes (central electrode 16a and side electrode 16b) of the spark plug 16 are housed in the sub-chamber 15.

Specifically, the electrodes are disposed substantially at the center of the sub-chamber 15 on the axis of the spark plug 16. Therefore, the distance from the ignition portions of the electrodes to the pre-chamber 17 is approximately the same throughout the pre-chamber 17.

The pre-chamber 17 has a plurality of (four in the exemplary drawing) injection holes 18 (equivalent to the through-holes) that pass through the pre-chamber 17. The sub-chamber 15 communicates with the main chamber 14 through these injection holes 18. These injection holes 18 are disposed at intervals in the circumferential direction around the electrodes.

Figure 2B:
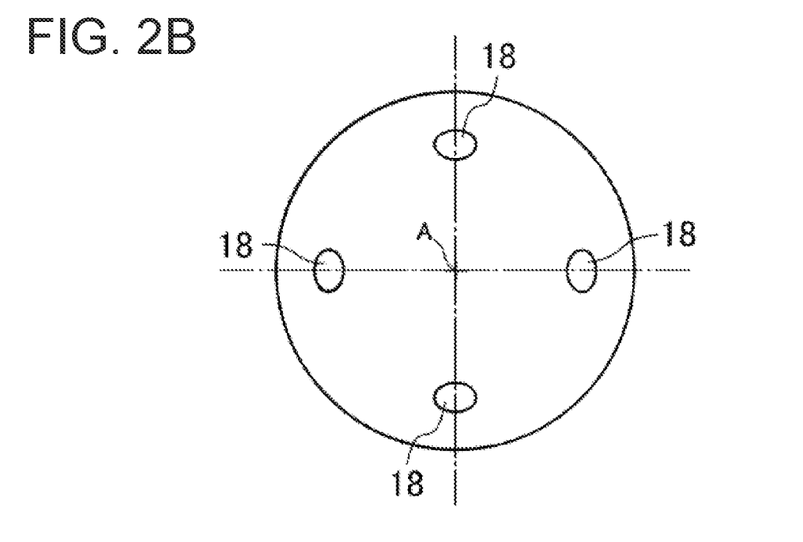
FIG. 2B is a diagram seen from below.

Specifically, as illustrated in FIG. 2B, when the tip portion of the pre-chamber plug 12 is seen from the axial direction thereof, the injection holes 18 are disposed at 90° intervals in the circumferential direction around the axis of the pre-chamber plug 12 that passes through an apex A of the pre-chamber 17.

As illustrated in FIG. 2A, any of these injection holes 18 is formed to extend in a direction of approximately 45° at a position of approximately 45° from the apex A of the pre-chamber 17 in side view. As a result, flames are injected through the injection holes 18 at an angle of approximately 45° with respect to the axis of the spark plug 16. It should be noted that the number of injection holes 18 is not limited to four. As described later, the number of injection holes 18 is preferably greater than or equal to four and less than or equal to six.

These injection holes 18 have a function of first causing the air-fuel mixture formed in the main chamber 14 to flow into the sub-chamber 15. These injection holes 18 have a function of secondly causing the flame generated in the sub-chamber 15 to be injected and radiated into the main chamber 14 by igniting the air-fuel mixture having flowed into the sub-chamber 15. This causes the flame injected from the pre-chamber 17 to ignite the air-fuel mixture in the main chamber 14 and promotes the flame propagation, thereby accelerating the combustion of the air-fuel mixture in the main chamber 14.

That is, this engine 1 with the pre-chamber plug 12 can perform ignition using the pre-chamber ignition system (passive pre-chamber).

(Characteristics of the Pre-Chamber Ignition System)

In this engine 1 that performs ignition using the pre-chamber ignition system, fuel is injected at least in an intermediate term (for example, at a crank angle of −300° ATDC) of the intake stroke. Depending on the operating region of the engine 1, part of the fuel may be split-injected in the compression stroke.

The fuel is injected in the intake stroke and then atomized to generate an air-fuel mixture in the main chamber 14. The air-fuel ratio of the air-fuel mixture is preferably controlled to a value from the theoretical air-fuel ratio ($\lambda=1$) to a lean air-fuel ratio ($\lambda>1$). For example, to achieve both the improvement in fuel efficiency and the suppression of knock, the air-fuel ratio of the air-fuel mixture may be controlled to the theoretical air-fuel ratio together with the introduction of EGR gas in the operating region of medium load. In the operating region of high load and high rotation, the air-fuel ratio of the air-fuel mixture may be controlled to a lean air-fuel ratio.

Part of the air-fuel mixture generated in the main chamber 14 flows into the sub-chamber 15 through the injection holes 18. Then, the spark plug 16 ignites and burns the air-fuel mixture in the sub-chamber 15 near the top dead center of the compression stroke to inject flame through the injection holes 18. The flame ignites and burns the air-fuel mixture in the main chamber 14.

It should be noted that it is difficult to achieve stable combustion with the pre-chamber ignition system because the fuel is not easily atomized at the startup or the like when the temperature of the engine 1 is low. Accordingly, in such a case, the air-fuel mixture in the main chamber 14 is preferably ignited and burned by the normal plug 13 in the same manner as before.

Figure 3:
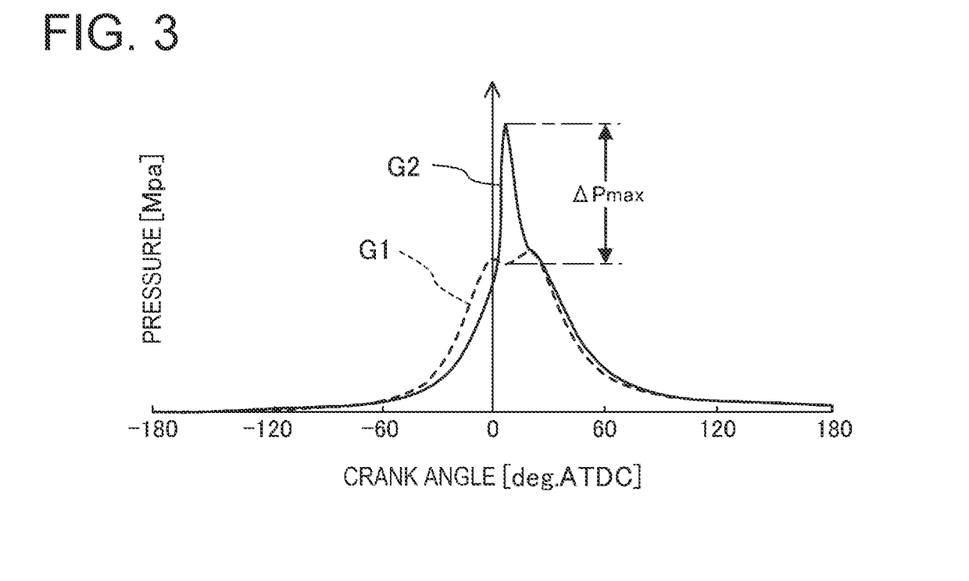
FIG. 3 is a diagram illustrating changes in the pressure over time (in the main chamber and the sub-chamber) during combustion with a pre-chamber ignition system.

FIG. 3 illustrates changes in the pressure over time during combustion with the pre-chamber ignition system. This is the data obtained by combustion with the pre-chamber ignition system under specified conditions in the operating region of medium load. In FIG. 3, a dashed line G1 in the graph illustrates changes in the pressure in the main chamber 14, and a solid line G2 in the graph illustrates changes in the pressure in the sub-chamber 15.

As described above, part of the air-fuel mixture generated in the main chamber 14 from the intake stroke to the compression stroke flows into the sub-chamber 15 through the injection holes 18. At that time, the injection holes 18 of the sub-chamber 15 become ventilation resistance. Accordingly, the pressure in the main chamber 14 rises when the piston 5 elevates, but the rise in the pressure in the sub-chamber 15 is gentler than that of the main chamber 14. That is, the pressure in the sub-chamber 15 is lower than that in the main chamber 14. As the pressure difference between the sub-chamber 15 and the main chamber 14 is larger, the filling degree of the air-fuel mixture flowing into the sub-chamber 15 becomes smaller.

Then, the air-fuel mixture having flowed into the sub-chamber 15 is ignited near the top dead center (for example, at −10° ATDC) of the compression stroke. As a result, the air-fuel mixture burns in the sub-chamber 15, the pressure in the sub-chamber 15 rises sharply, and the pressure in the sub-chamber 15 becomes higher than the pressure in the main chamber 14 after the top dead center of the compression stroke. Then, the pressure in the sub-chamber 15 reaches the peak, and the pressure difference between the main chamber 14 and the sub-chamber 15 becomes maximum ($\Delta Pmax$). As the pressure difference between the sub-chamber 15 and the main chamber 14 is larger, the momentum of the flame injected from the pre-chamber 17 becomes larger.

Figure 4:
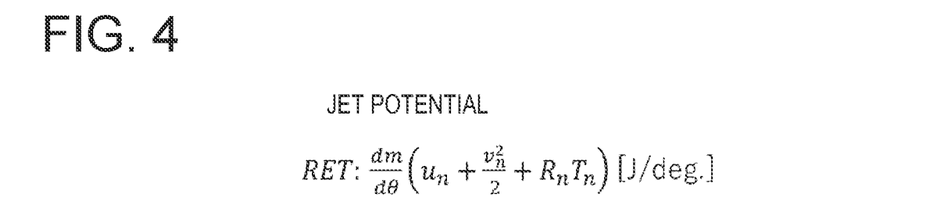
FIG. 4 is a formula for calculating a jet potential.

The momentum of the flame injected from the pre-chamber 17 greatly affects the combustion speed of the air-fuel mixture in the main chamber 14. In the technology disclosed herein, a jet potential (RET) is used as an index for determining the momentum of the flame injected from the pre-chamber 17. The jet potential corresponds to the energy transfer ratio between the sub-chamber 15 and the main chamber 14. FIG. 4 illustrates the formula for calculating the jet potential.

Figure 5:
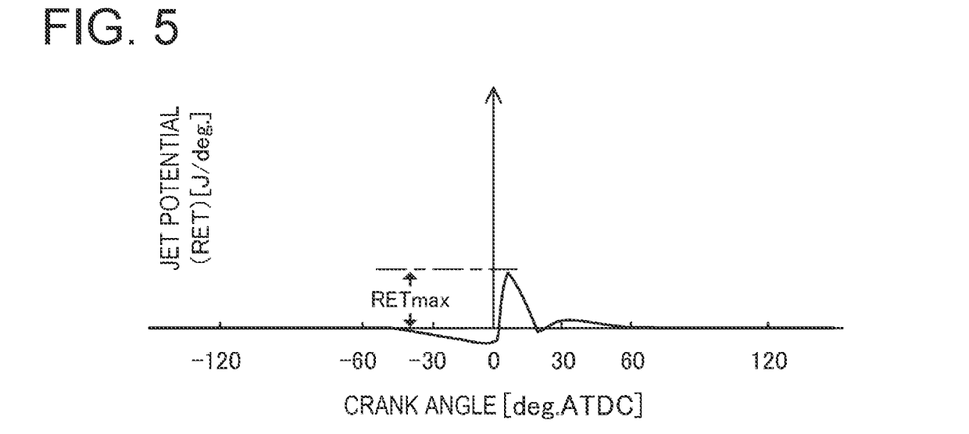
FIG. 5 is a diagram illustrating changes in the jet potential over time that correspond to FIG. 3.

Then, FIG. 5 illustrates changes in the jet potential over time that correspond to FIG. 3. The momentum of the flame injected from the pre-chamber 17 can be determined based on the jet potential. That is, the momentum of flame can be determined to be strong when the jet potential is large, and the momentum of flame can be determined to be weak when the jet potential is small.

Specifically, since the timing at which $\Delta Pmax$ appears in FIG. 3 corresponds to the timing at which the flame is injected from the pre-chamber 17, the momentum of the flame injected from the pre-chamber 17 can be determined based on the jet potential (RETmax) at that time.

Since the density of the air-fuel mixture in the sub-chamber 15 becomes larger as the compression ratio $\varepsilon$ is larger, RETmax becomes larger. In addition, since the thermal energy generated in the sub-chamber 15 becomes larger as the volume of the sub-chamber 15 is larger, RETmax becomes larger. RETmax is also affected by the size and the number of injection holes 18, the volume and the shape of the cylinder 4, and the like.

(Problems with the Pre-Chamber Ignition System)

As described above, the momentum of the flame injected from the pre-chamber 17 is affected by physical conditions (also referred to as the engine structural elements) of the engine 1, such as the compression ratio ε, the size and the number of the injection holes 18, the volume of the sub-chamber 15. Accordingly, stable combustion with good fuel efficiency cannot be easily achieved in both the operating region of medium load and the operating region of high load and high rotation having combustion conditions that are greatly different from each other.

That is, since the amount of fuel is determined basically according to the output requirement of the engine 1, the momentum of the flame injected from the pre-chamber 17 is strongly affected by the engine structural elements. Accordingly, it is difficult to find the engine structural elements that achieve stable combustion with good fuel efficiency in both the operating region of medium load in which the amount of fuel is relatively small and the operating region of high load and high rotation in which the amount of fuel is relatively large and the stroke interval is small.

The flame propagation within the main chamber 14 is preferably accelerated to minimize the amount of fuel for improving the thermal efficiency and suppress a misfire of the air-fuel mixture in that state in the operating region of medium load. Accordingly, when the engine structural elements are set so that the momentum of the flame injected from the pre-chamber 17 is gained to accelerate the flame propagation in the main chamber 14, the flame propagation in the main chamber 14 becomes excessively fast and strong knock is likely to occur in the operation region of high load and high rotation.

When control for delaying the ignition timing is made to suppress strong knock, the thermal efficiency reduces. Accordingly, stable combustion with good fuel efficiency cannot be easily achieved in both the operating region of medium load and the operating region of high load and high rotation. Achievement with the passive pre-chamber is more difficult than achievement with the active pre-chamber.

That is, for the active pre-chamber, the fuel is injected into the sub-chamber 15, so the amount of fuel in the sub-chamber 15 can be adjusted directly. Accordingly, although there are restrictions, strong knock can be suppressed by changing the fuel injection conditions such as split injection to weaken the momentum of the flame injected from the pre-chamber 17.

In contrast, for the passive pre-chamber, the fuel is injected into the main chamber 14, so the amount of fuel in the sub-chamber 15 can only be adjusted indirectly. The momentum of the flame in the passive pre-chamber is substantially uniquely determined by the engine structural elements. Accordingly, the passive pre-chamber is much more limited in the range and conditions for adjusting the amount of fuel in the sub-chamber 15 than the active pre-chamber.

Accordingly, the inventors and others have studied measures to suppress strong knock in this engine 1 that employs the passive pre-chamber. As a result of the study, the inventors and others have found that occurrence of strong knock may be promoted by simply weakening the momentum of the flame injected from the pre-chamber 17 and that the relationship is satisfied under optimum conditions.

The technology disclosed herein is based on this knowledge. Then, the engine 1 is configured to effectively suppress strong knock while achieving stable combustion with good fuel efficiency in the operating region of medium load based on this knowledge.

<Suppression of Strong Knock>

As described above, this engine 1 can promote flame propagation by adopting the pre-chamber ignition system to accelerate the combustion speed of the air-fuel mixture in the main chamber 14 in the operating region of medium load. This achieves stable combustion even when the concentration of the air-fuel mixture in the main chamber 14 is the minimum required, thereby improving the thermal efficiency.

In contrast, since the pre-chamber ignition system is adopted, strong knock is more likely to occur in the operating region of high load and high rotation. Moreover, this engine 1 has a higher compression ratio ε than a normal engine, so strong knock is more likely to occur. As a measure against this, strong knock can be suppressed without reducing the fuel efficiency by weakening the momentum of the flame injected from the pre-chamber 17.

However, as a result of an examination of the relationship between strong knock and the momentum of the flame injected from the pre-chamber 17 in a test (including thermal analysis described later), the inventors and others found that strong knock is promoted on the contrary when the momentum of the flame is weakened too much and that a proper momentum of flame is required to effectively suppress strong knock.

Figure 6:
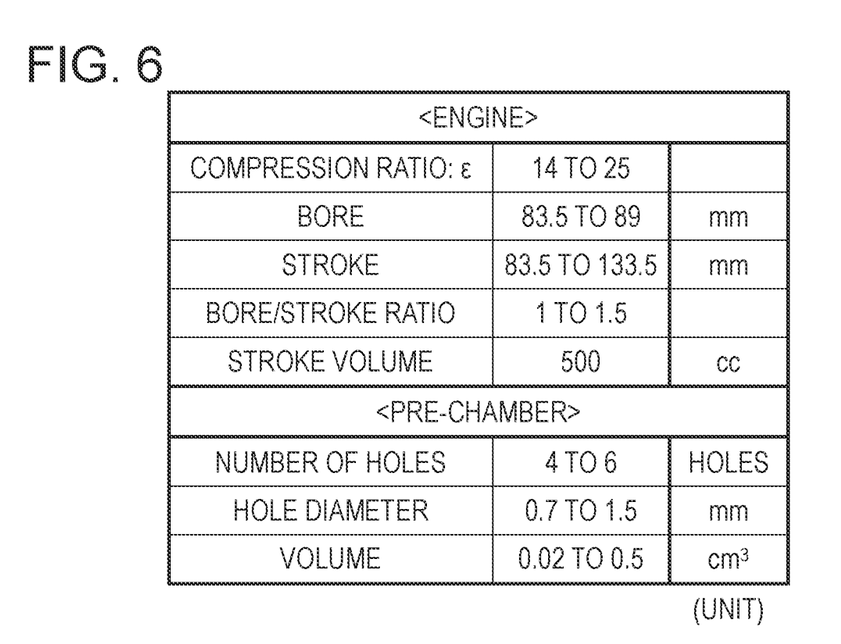
FIG. 6 is a table illustrating the main specifications of the engine used in a test.

FIG. 6 illustrates the main specifications (engine structural elements) of the engine adopted in the test. The engine used in the test is a naturally aspirated gasoline engine similar to the engine 1 in the embodiment described above and is configured to inject fuel into the main chamber 14 (passive pre-chamber). In the test, conditions were set as appropriate according to the content within the range of each of the engine structural elements illustrated in FIG. 6.

(Relationship Between Strong Knock and the Jet Potential)

Figure 7:
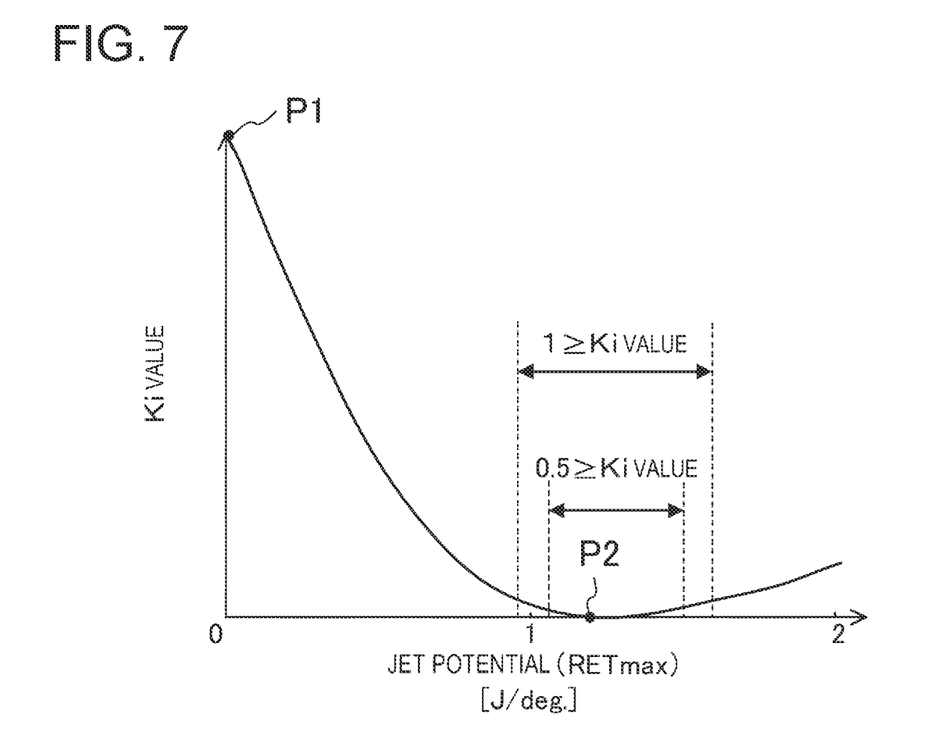
FIG. 7 is a diagram illustrating the relationship between the occurrence of strong knock and the jet potential.

FIG. 7 illustrates the results of an investigation of the relationship between the occurrence of strong knock and the jet potential.

FIG. 7 illustrates the relationship between the Ki value and the jet potential in the operating region of high load and high rotation. Specifically, FIG. 7 illustrates the relationship between the Ki value and the jet potential when the engine with a compression ratio ε of 17 operated at 6,000 rpm and fully open load (so-called full throttle state).

In the test, conditions were set so as to obtain different jet potentials by changing the volume of the sub-chamber 15 and the diameter of the injection holes 18. It should be noted that the bore/stroke ratio of the engine used in this test was set to 1.1.

The Ki value is an index representing the intensity of knock (knock intensity). The Ki value is calculated based on the vibration data of pressure waves generated in the cylinder, typically a maximum peak-to-peak measurement. The vibration data is detected by a knock sensor, a cylinder pressure sensor, or the like. The Ki value here indicates the average value of the knock intensities generated in 300 combustion cycles. Accordingly, when strong knock occurs in the sampling period even at a low frequency, the Ki value becomes high according to the intensity and frequency of the knock.

Figure 8:
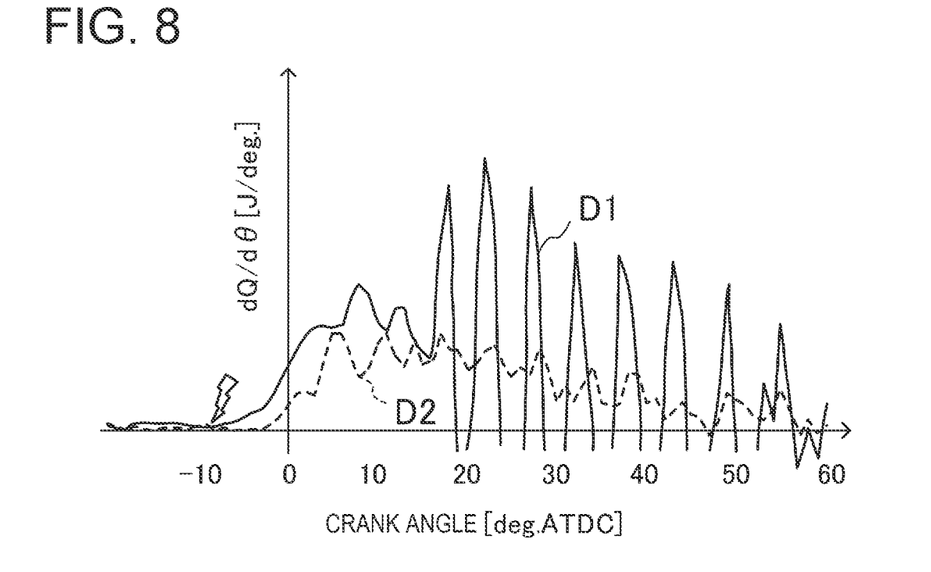
FIG. 8 illustrates examples of vibration data at points P1 and P2 in FIG. 7.

FIG. 8 illustrates an example of the vibration data at points P1 and P2 on the solid line in the graph illustrated in FIG. 7. A solid line D1 in the graph indicates the vibration data at point P1 at which the jet potential is 0 (zero). A dashed line D2 in the graph indicates the vibration data at point P2 at which the jet potential is 1.2. The vertical axis represents the heat generation rate of the combustion chamber 6.

The solid line D1 in the graph indicates the test results of the engine without the pre-chamber 17, that is, in the engine having the spark plug 16 exposed to the main chamber 14 (corresponding to a normal ignition system). The dashed line D2 in the graph indicates the test results of the engine provided with the pre-chamber 17 that has four injection holes 18 with a diameter (p of 1.0 mm and has the sub-chamber 15 with a volume of 0.31 cc. Any ignition timings are immediately before the top dead center (−10° ATDC).

In the solid line D1 in the graph, large pressure fluctuations (that is, occurrence of strong knock) are recognized from a predetermined period after ignition has passed. In contrast, unlike the solid line D1 in the graph, the dashed line D2 in the graph does not show large pressure fluctuations. It can be seen from the dashed line D2 in the graph that strong knock is suppressed. The Ki value is calculated based on such vibration data.

As illustrated in FIG. 7, an inflection point of the Ki value was observed with respect to decrease in the jet potential. Specifically, the Ki value decreased as the jet potential decreased from 2 and was locally minimized when the jet potential is around 1.2. After that, the Ki value increased as the jet potential decreased. The change amount of the Ki value in the range in which the jet potential was less than or equal to the local minimum value tended to be larger than the change amount of the Ki value in the range in which the jet potential was greater than or equal to the local minimum value.

When the momentum of the flame is strong (in the range in which the jet potential is greater than or equal to the local minimum value), the flame propagation in the main chamber 14 becomes faster according to the momentum, so abnormal combustion is likely to occur. As a result, when air column resonance occurs in the main chamber 14 due to a rapid increase in the combustion pressure, strong knock caused by the pre-chamber ignition system occurs. Accordingly, in such a case, strong knock can be suppressed by reducing the momentum of the flame (that is, the jet potential) that caused the strong knock.

In contrast, when the momentum of the flame is weak (in the range in which the jet potential is less than or equal to the local minimum value), the flame propagation in the main chamber 14 slows down according to the momentum, so abnormal combustion is unlikely to occur. Accordingly, the strong knock caused by the pre-chamber ignition system can be suppressed.

In contrast, when the momentum of the flame is weakened, the flame does not easily reach the peripheral portion of the main chamber 14. As a result, since the flame does not spread to the peripheral portion of the main chamber 14 in the operating region of high rotation, self-ignition of the end gas existing in the peripheral portion of the main chamber 14 is induced, so it is thought that strong knock is likely to occur.

Based on the data accumulated so far, the range of the Ki value that is practically preferable is less than or equal to 1, including measurement error. More preferably, the range is less than or equal to 0.5. FIG. 7 illustrates the range in which the Ki value is less than or equal to 1 and the range in which the Ki value is less than or equal to 0.5.

The range in which the Ki value is less than or equal to 1 corresponds to the range in which the jet potential is greater than or equal to 0.95 and less than or equal to 1.6. The range in which the Ki value is less than or equal to 0.5 corresponds to the range in which the jet potential is greater than or equal to 1.05 and less than or equal to 1.5.

Accordingly, strong knock can be effectively suppressed by setting the engine structural elements so as to obtain the jet potential in the range corresponding to the range of appropriate Ki values. Moreover, since the momentum of the flame can be obtained to some extent within the range of the jet potentials, a misfire can be suppressed even in the operating region of medium load. That is, strong knock can be effectively suppressed while stable combustion with good fuel efficiency is achieved in the operating region of medium load. Appropriate combustion can be achieved in both the operating region of medium load and the operating region of high load and high rotation.

<Engine Structural Elements Regarding the Jet Potential>

The engine structural elements regarding the jet potential include the compression ratio ε, the size of the injection holes 18, the number of injection holes 18, the bore and the stroke, the volume of the sub-chamber 15, the stroke volume, and the like.

(Compression Ratio ε)

The compression ratio ε of the engine is set based on the required specifications of the engine. A lower compression ratio ε is preferable to suppress knock, but a low compression ratio ε is disadvantageous to improve the thermal efficiency. Accordingly, the engine 1 employs a compression ratio ε higher than in ordinary engines and the compression ratio ε is set to a value in the range from 14 to 25, inclusive, as appropriate, as described above.

(Size and the Number of Injection Holes 18)

Four to six injection holes 18 with a diameter from 0.7 mm to 1.5 mm, inclusive, are preferably formed. Then, these injection holes 18 are preferably disposed at intervals in the circumferential direction around the electrodes of the spark plug 16. It should be noted that the injection holes 18 do not have to be perfect-circular as long as they are circular.

Regarding the size of the injection hole 18, the ventilation resistance becomes smaller as the injection hole 18 is larger, and the ventilation resistance becomes larger as the injection hole 18 is smaller. When the ventilation resistance is small, the air-fuel mixture easily flows into the sub-chamber 15 and the exhaust gas easily flows out of the sub-chamber 15. Accordingly, in terms of intake and exhaust of air of the sub-chamber 15, the injection holes 18 are preferably large.

In contrast, the momentum of the flame injected from the pre-chamber 17 becomes weaker as the injection holes 18 are larger and the momentum becomes stronger as the injection holes 18 are smaller. Accordingly, the size of the injection holes 18 directly affects the magnitude of the jet potential. On the other hand, by setting the injection holes 18 to have a size in the range described above, the jet potential can be set within the optimum range described above while appropriate ventilation resistance is ensured.

When the number of injection holes 18 is less than or equal to three, the range within which the flame injected from the pre-chamber 17 is distributed in the circumferential direction becomes narrow, so the combustion in the main chamber 14 may be nonuniform. When the number of injection holes 18 is greater than or equal to seven, the range within which the range of the flame distributed in the circumferential direction extends, but these injection holes 18 are difficult to achieve because, for example, the strength of the pre-chamber 17 disadvantageously reduces.

Moreover, the number of injection holes 18 also affects the jet potential. For example, when the opening area of the pre-chamber 17 is the same, the size of the injection holes 18 needs to be increased if the number of injection holes 18 is small and the size of the injection holes 18 needs to be decreased if the number of injection holes 18 is large. In contrast, since the size of the injection holes 18 can be set within an appropriate range when the number of injection holes is greater than or equal to four and less than or equal to six, the jet potential can be set within the optimum range described above while the flame is appropriately distributed in the circumferential direction of the combustion chamber 6.

(Bore and Stroke)

Figure 9:
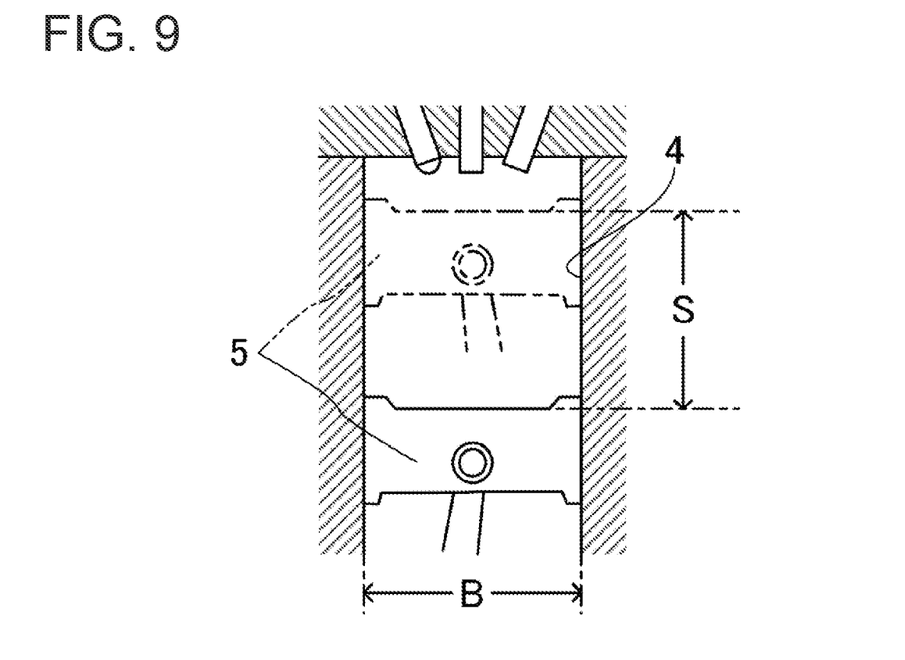
FIG. 9 is a diagram for describing a bore/stroke ratio.

A bore B is the inner diameter of the cylinder 4 as schematically illustrated in FIG. 9. A stroke S is the distance traveled by the piston 5 from the bottom dead center (position indicated by the solid line) to the top dead center (position indicated by the dot-dot-dash line) in the cylinder 4.

The ratio (S/B) obtained by dividing the stroke S having these ratios by the bore B is generally referred to as the bore/stroke ratio. When the volume is the same, the stroke S becomes larger and the bore B becomes smaller as the bore/stroke ratio is larger. In addition, the stroke S becomes smaller and the bore B becomes larger as the bore/stroke ratio is smaller.

Since the travel speed of the piston 5 becomes larger as the stroke S is larger, the flow in the combustion chamber 6 becomes larger and combustion is promoted. Since the surface area of the combustion chamber 6 becomes smaller as the bore B is smaller, the heat loss is suppressed. Accordingly, the engine with a large bore/stroke ratio is preferable to improve the thermal efficiency in the operating region of medium load or the like, but not preferable to suppress strong knock because the combustion speed and cylinder temperature are likely to be excessively high in the operating region of high load and high rotation.

In contrast, since the travel speed of the piston 5 becomes smaller when the stroke S is smaller, the flow in the combustion chamber 6 becomes smaller. When the bore B is larger, the heat loss becomes larger accordingly. Therefore, the engine with a small bore/stroke ratio is preferable to suppress strong knock because the combustion speed and cylinder temperature are suppressed in the operating region of high load and high rotation, but not preferable to improve the thermal efficiency in the operating region of medium load or the like.

In contrast, the bore/stroke ratio of the engine 1 is set to a range from 1 to 1.5, which is relatively large. The bore/stroke ratio is preferably less than 1 in terms of suppressing strong knock, but the engine 1 can suppress strong knock by setting the jet potential to an optimum range. Accordingly, the bore/stroke ratio can be set so as to prioritize the improvement in the fuel efficiency.

In addition, since the distance from the pre-chamber 17 to the outer edge portion of the combustion chamber 6 is small when the bore B is small, the flame can easily reach the peripheral portion of the combustion chamber 6. This can effectively burn the end gas even in the operating region of high rotation. Accordingly, by setting the bore/stroke ratio to the range described above, strong knock can be effectively suppressed while stable combustion with good fuel efficiency is achieved in the operating region of medium load.

(Volume of the Sub-Chamber 15)

The flame injected from the pre-chamber 17 is generated by igniting the air-fuel mixture in the sub-chamber 15. Accordingly, the momentum of the flame becomes stronger as the heat energy obtained from the air-fuel mixture is larger. Since the amount of the air-fuel mixture that can be housed in the sub-chamber 15 becomes larger as the volume of the sub-chamber 5 is larger, the thermal energy obtained from the air-fuel mixture also becomes larger. Accordingly, the volume of the sub-chamber 15 greatly affects the jet potential.

Figure 10:
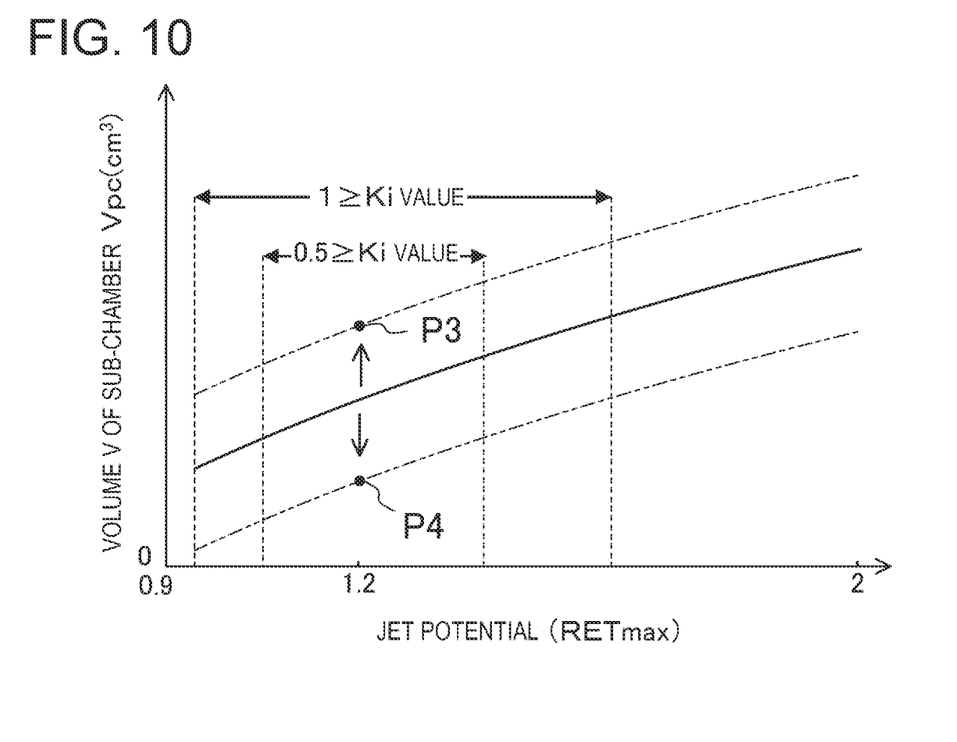
FIG. 10 is a diagram illustrating the relationship between the volume of the sub-chamber and the jet potential that enables the suppression of strong knock.

FIG. 10 illustrates the relationship between the jet potential and a volume Vpc of the sub-chamber 15 for enabling the suppression of strong knock obtained by thermal analysis. The volume Vpc of the sub-chamber 15 increases by a predetermined change amount as the jet potential increases. Then, as indicated by the dot-dot-dash line, the volume Vpc of the sub-chamber 15 increases or decreases depending on the compression ratio $\varepsilon$ of the engine 1. Specifically, the volume Vpc of the sub-chamber 15 decreases when the compression ratio $\varepsilon$ increases, and the volume Vpc of the sub-chamber 15 increases when the compression ratio $\varepsilon$ decreases.

For example, when the jet potential is 1.2, which corresponds the optimal conditions, the volume Vpc (point P3) of the sub-chamber 15 is preferably set to 0.31 cc for the engine 1 with a compression ratio $\varepsilon$ of 14, and the volume Vpc (point P4) of the sub-chamber 15 is preferably set to 0.12 cc for the engine 1 with a compression ratio $\varepsilon$ of 25.

(Stroke Volume)

The stroke volume is the volume of exhaust in the stroke in which the piston 5 moves from the bottom dead center to the top dead center and corresponds to the volume of the cylinder 4 in the range indicated by the stroke S in FIG. 9. The amount of the air-fuel mixture that can be housed in the combustion chamber 6 becomes larger as the stroke volume is larger. When the amount of fuel increases accordingly, strong knock is likely to occur. Accordingly, when the stroke volume increases, the range of the engine structural elements that can be set is limited accordingly.

<Specific Ratio Corresponding to the Suppression of Strong Knock>

In the technology disclosed herein, a specific ratio (specification-defined ratio) is set by thermal analysis based on the engine structural elements described above.

That is, as described above, the strong knock (strong knock at low jet flow rate) that occurs when the momentum of the flame is weak depends on the positional relationship between the flame and the end gas. Accordingly, the strong knock is affected by the shape of the combustion chamber 14 and the state of the air-fuel mixture.

For example, when the volume of the sub-chamber 15 is the same, since flame more easily reaches the peripheral portion of the combustion chamber 14 if the bore or the stroke volume is smaller, strong knock at low jet flow rate is unlikely to occur. In contrast, since flame does not easily reach the peripheral portion of the combustion chamber 14 if the bore or the stroke volume is larger, strong knock at low jet flow rate is likely to occur.

Accordingly, organization with a specific ratio is necessary to appropriately and effectively identify such conditions about the suppression of strong knock at low jet flow rate, so the specification-defined ratio is set. Then, by configuring the engine so that the specification-defined ratio falls within a predetermined range, the jet potential can be kept within the appropriate range described above and strong knock can be effectively suppressed.

Specifically, the engine 1 is configured so that the ratio (Vpc/Vst) obtained by dividing the volume Vpc of the sub-chamber 15 by a stroke volume Vst, which is set as the specification-defined ratio, falls within the range from 0.00005 to 0.00045, inclusive.

Figure 11:
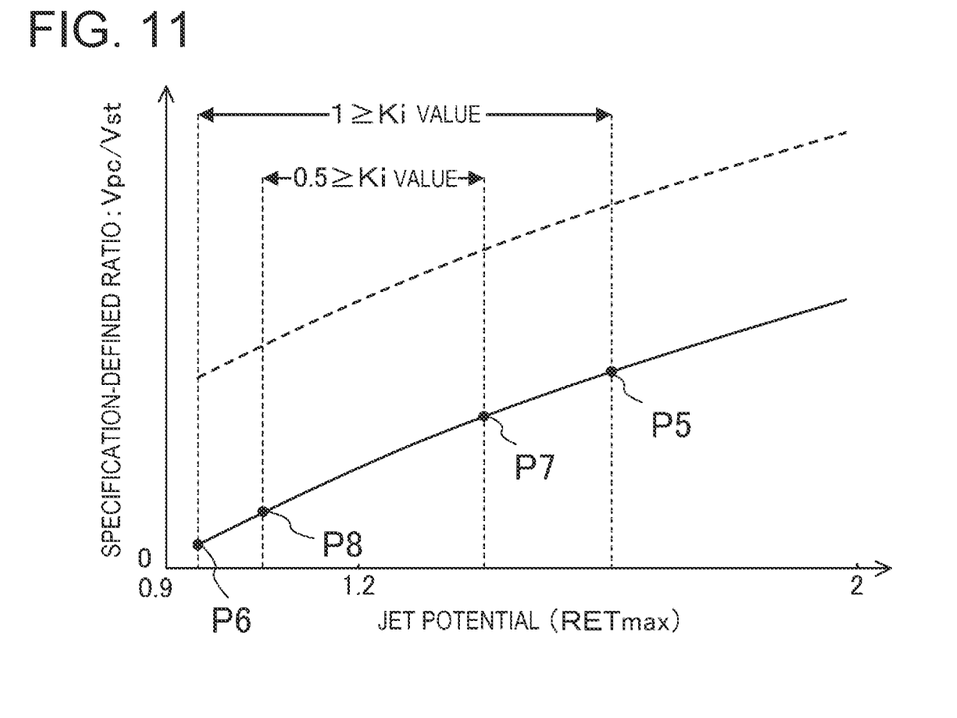
FIG. 11 is a diagram illustrating the relationship between a specification-defined ratio and the jet potential.

FIG. 11 illustrates the relationship between the jet potential and the specification-defined ratio obtained by thermal analysis. In the thermal analysis, the compression ratio ε is set so as to fall within the predetermined range described above, that is, the range from 14 to 25. Similarly, the bore/stroke ratio is set to greater than or equal to 1 and less than or equal to 1.5, the diameter of the injection holes 18 is set to greater than or equal to 0.7 mm and less than or equal to 1.5 mm, and the number of injection holes 18 is set to greater than or equal to four and less than six or equal to.

Then, the volume Vpc of the sub-chamber 15 is set to fall within a predetermined range illustrated in FIG. 10 while corresponding to the compression ratio ε with the stroke volume Vst set to 500 cc. This sets the specification-defined ratio.

As illustrated in FIG. 11, the specification-defined ratio that can satisfy these conditions increases as the jet potential increases. Of the conditions described above, the solid line in the graph corresponds to the condition under which strong knock is most likely to occur, such as a compression ratio of 25 or the like. In addition, the dashed line in the graph corresponds to the condition under which strong knock is least likely to occur, such as a compression ratio of 14 or the like. When the jet potential is the same, the specification-defined ratio under conditions under which strong knock is less likely to occur is larger than the specification-defined ratio under conditions under which strong knock is likely to occur.

On the other hand, in the engine 1, a range from 0.00005 to 0.00045 is set as the range of the specification-defined ratio corresponding to the above range in which the Ki value is less than or equal to 1. In FIG. 11, the upper limit value 0.00045 of the specification-defined ratio corresponds to point P5 and the lower limit value 0.00005 corresponds to point P6.

That is, in this engine 1, the range of the specification-defined ratio is set under a severe condition under which strong knock is most likely to occur among the conditions described above. Specifically, the compression ratio ε is 25 and the bore/stroke ratio is 1.5, which are the upper limit values of these ratios. The number of injection holes 18 is four.

Accordingly, other ranges of the conditions described above are not stricter than this, so the range of the specification-defined ratio can be set more easily and strong knock can be effectively suppressed.

Furthermore, the specification-defined ratio is preferably set to greater than or equal to 0.00013 and less than or equal to 0.00035. That is, this range corresponds to the above range in which the Ki value is less than or equal to 0.5 and strong knock can be suppressed stably and effectively. In FIG. 11, the upper limit value 0.00035 of the specification-defined ratio corresponds to point P7 and the lower limit value 0.00013 corresponds to point P8.

As described above, according to the engine 1 to which the technology disclosed herein has been applied, the occurrence of strong knock can be effectively prevented in the operating region of high load and high rotation while stable combustion with good fuel efficiency is achieved in the operating region of medium load. Accordingly, the engine with good thermal efficiency can be achieved.

It should be noted that the technology disclosed herein is not limited to the embodiment described above, and also includes various other structures. For example, the structure of the engine 1 illustrated in the embodiment described above is an example, and the normal plug 13 facing the main chamber 14 may be omitted. In addition, the number of cylinders 4 is not limited to four.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1: engine
2: cylinder block
3: cylinder head
4: cylinder
5: piston
6: combustion chamber
11: injector
12: pre-chamber plug
13: normal plug
14: main chamber
15: sub-chamber
16: spark plug
17: pre-chamber
18: injection hole (through-hole)

The invention claimed is:

1. An engine comprising:
a cylinder block in which a cylinder is formed;
a cylinder head assembled onto the cylinder block to cover a top of the cylinder;
a piston provided so as to reciprocate inside the cylinder, the piston defining a combustion chamber together with the cylinder block and the cylinder head; and
a spark plug that performs ignition in the combustion chamber,
wherein the combustion chamber includes a sub-chamber that houses an electrode of the spark plug, and a main chamber separated from the sub-chamber by a partition wall having a through-hole, the main chamber having a volume larger than a volume of the pre-chamber, and
wherein a specific ratio obtained by dividing a volume of the sub-chamber by a stroke volume of the cylinder is greater than or equal to 0.00005 and less than or equal to 0.00045.

2. The engine according to claim 1,
wherein the specific ratio is greater than or equal to 0.00013 and less than or equal to 0.00035.

3. The engine according to claim 2,
wherein a bore/stroke ratio is set to greater than or equal to 1 and less than or equal 1.5.

4. The engine according to claim 3,
wherein a compression ratio of the engine is greater than or equal 14 and less than or equal to 25.

5. The engine according to claim 4, further comprising:
an injector that injects fuel into the main chamber,
wherein an air-fuel mixture in the sub-chamber is generated by causing the fuel injected by the injector to flow into the sub-chamber through the through-hole.

6. The engine according to claim 5,
wherein the injector injects liquid fuel.

7. The engine according to claim 6,
wherein the through-hole is one of four to six through-holes that are formed in the partition wall so as to be arranged at intervals in a circumferential direction around the electrode of the spark plug.

8. The engine according to claim 2,
wherein a bore/stroke ratio is set to greater than or equal to 1 and less than or equal 1.5.

9. The engine according to claim 3,
wherein a compression ratio of the engine is greater than or equal 14 and less than or equal to 25.

10. The engine according to claim 3,
wherein a compression ratio of the engine is greater than or equal 14 and less than or equal to 25.

11. The engine according to claim 4, further comprising:
an injector that injects fuel into the main chamber,
wherein an air-fuel mixture in the sub-chamber is generated by causing the fuel injected by the injector to flow into the sub-chamber through the through-hole.

12. The engine according to claim 4, further comprising:
an injector that injects fuel into the main chamber,
wherein an air-fuel mixture in the sub-chamber is generated by causing the fuel injected by the injector to flow into the sub-chamber through the through-hole.

13. The engine according to claim 4, further comprising:
an injector that injects fuel into the main chamber,
wherein an air-fuel mixture in the sub-chamber is generated by causing the fuel injected by the injector to flow into the sub-chamber through the through-hole.

\* \* \* \* \*